UNITED STATES PATENT OFFICE.

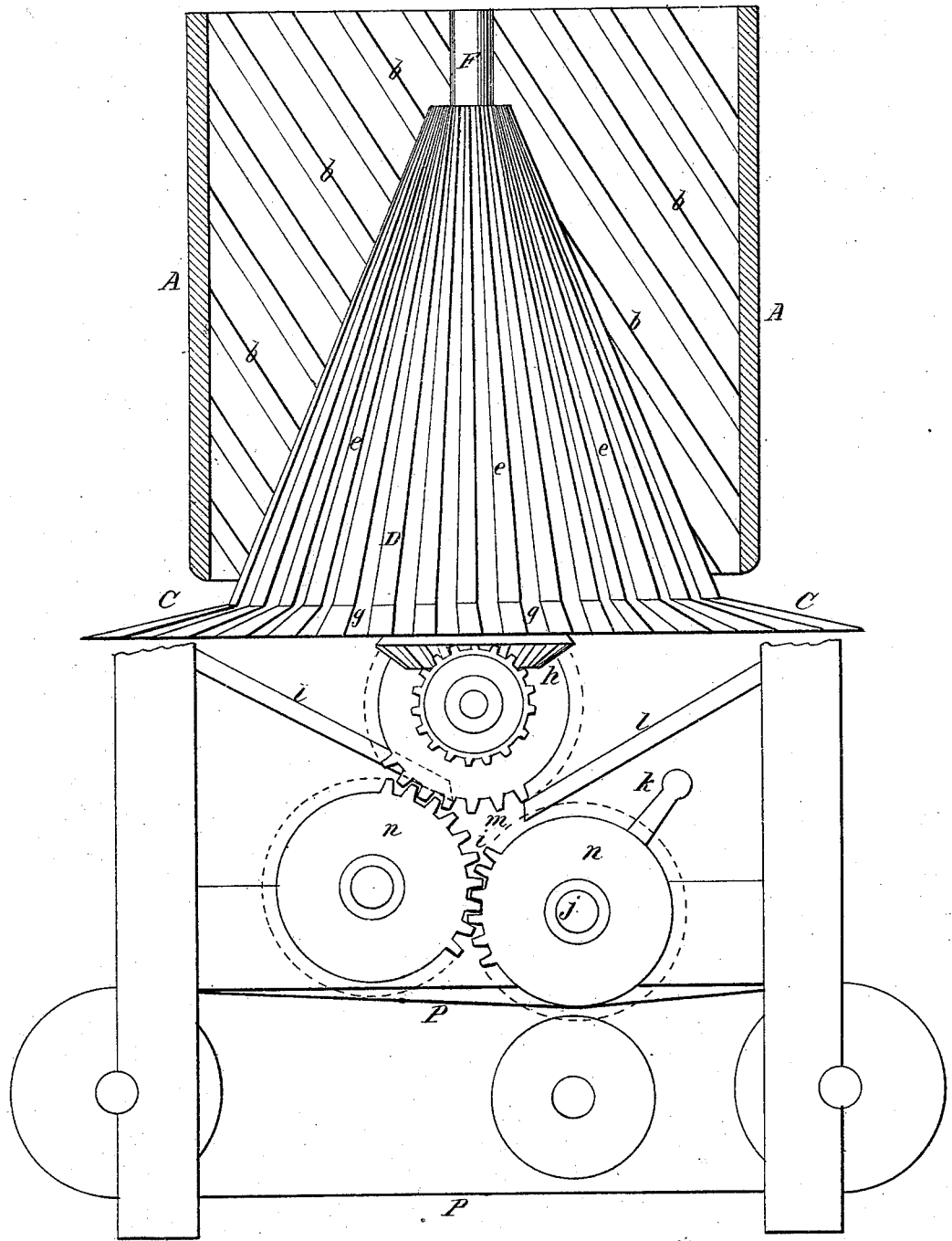

OLIVER HYDE, OF OAKLAND, CALIFORNIA.

IMPROVEMENT IN GRAPE CRUSHERS AND STEMMERS.

Specification forming part of Letters Patent No. 131,352, dated September 17, 1872.

*To all whom it may concern:*

Be it known that I, OLIVER HYDE, of Oakland, county of Alameda, State of California, have invented an Improved Grape Crusher and Stemmer; and I do hereby declare the following description and accompanying drawing are sufficient to enable any person skilled in the art or science to which it most nearly appertains to make and use my said invention or improvements without further invention or experiment.

My invention relates to an improved machine for stemming grapes and afterward macerating or crushing them in order to extract the first quality or white liquor by a regulated pressure, and from which the marc may be removed to a press for the subsequent and stronger pressure, by which the colored liquor is produced; and it consists of a tub suitably mounted, the interior surface of which is provided with angularly-placed ribs. Inside of this tub a cone, which is also constructed of ribs or slats, is arranged to be revolved, between which and the tub the grapes are placed, and by which the grapes are rubbed off from the stems. After being removed from the stems the grapes are passed between two rollers, which press them gently so as to squeeze out the free liquor of the pulp. A perforated belt below the rollers serves to carry off the marc, while it permits the liquor to pass through.

In order to more fully illustrate and explain my invention, reference is had to the accompanying drawing forming a part of this specification, in which—

A represents a bottomless tub or vessel, which is mounted upon a suitable frame-work, as shown. Around the inside of this vessel are secured inclined ribs *b*, at equal distances from each other. Directly below the vessel A is an annular apron, C, which supports the lower end or base of a cone, D. This cone is constructed of slats *e*, which, at their upper end or apex, are secured to a vertical shaft, F, by which the cone and apron are revolved. This cone passes up through the tub A, having its apex at the top, as shown. At the foot of each of the slats which form the cone a short rib, *g*, is fixed upon the apron C at an angle to the slats, as shown. The shaft F, which carries the cone, is revolved by means of bevel-gears *h i*, shaft *j*, and crank *k*. Below the revolving cone two inclined tables, *l l*, are arranged opposite each other, both pitching toward the same point so as to form a V-shaped trough with a slot, *m*, through its center. Upon these inclined tables the grapes will fall from the cone and be directed through the slot *m*, between two revolving rollers, *n n*, which are also driven by the crank *k*. These rollers crush the grapes and press out the white liquor of the pulp. The crushed grapes and liquor then fall upon an endless perforated belt, P, which passes over rollers at each side of the machine so as to pass under the pressing-rollers, and which serves not only to carry away the marc, but strains the already expressed liquors through into a vat beneath.

The grapes are placed in the tub A in clusters, just as they are taken from the vine. The revolution of the cone then causes the grapes to be caught between the slats *e*, which strips them from the vine, while the stems pass out upon the apron C, from which they fall to the ground. The grapes then drop from the cone into the V-trough, as above described.

By inclining the ribs *b*, which are secured to the side of the tub A, the grapes and stems which are placed in the tub will be gradually worked down toward the bottom of the tub; and as the space between the base of the cone and the bottom of the tub is not sufficiently large to permit the grapes to pass out with the stems the working downward of the mass will insure the thorough stemming of the grapes.

Having thus described my invention, what I claim, and desire to secure by Letters Patent, is—

1. The tub A, provided with the inclined ribs *b*, in combination with the revolving cone D, formed by the slats *e e e* rising from the apron C, and converging around the shaft F and the apron C, all constructed and arranged substantially as set forth.

2. The inclined tables l l, in combination with the revolving pressure-rollers n n and perforated straining and carrying belt P, as and for the purpose above described.

3. In combination with the tub A, I claim the conical revolving cylinder D, formed of the slats e e e, as described, and rollers n n, substantially as and for the purpose described.

In witness that the above-described invention is claimed by me I have hereunto set my hand and seal.

OLIVER HYDE. [L. S.]

Witnesses:
  GEO. H. STRONG,
  BENJN. C. FABRE.